US006182682B1

(12) United States Patent
Chen

(10) Patent No.: US 6,182,682 B1
(45) Date of Patent: Feb. 6, 2001

(54) PRESSURE BALANCE DEVICE FOR USE IN A FAUCET

(75) Inventor: Mei-Lee Chen, Tantzu (TW)

(73) Assignee: Kuching International Ltd., Tantzu (TW)

( * ) Notice: Under 35 U.S.C. 154(b), the term of this patent shall be extended for 0 days.

(21) Appl. No.: 09/371,898

(22) Filed: Aug. 11, 1999

(51) Int. Cl.$^7$ ............................. F16K 43/00; G05D 7/00
(52) U.S. Cl. ...................... 137/315.04; 137/98; 137/100; 137/315.01
(58) Field of Search .................... 137/98, 100, 315.04, 137/315.11, 315.12, 315.13, 454.2, 454.6

(56) References Cited

U.S. PATENT DOCUMENTS

| | | | |
|---|---|---|---|
| 3,921,659 | * 11/1975 | Rudewick III | 137/98 |
| 4,254,938 | * 3/1981 | Inada et al. | 137/315.04 |
| 5,010,917 | * 4/1991 | Iqbal | 137/454.6 |
| 5,299,593 | * 4/1994 | Ottelli | 137/100 |
| 5,355,906 | * 10/1994 | Marty et al. | 137/98 |
| 5,445,181 | * 8/1995 | Kuhn et al. | 137/98 |
| 5,501,244 | * 3/1996 | Shahriar | 137/98 |
| 5,725,010 | * 3/1998 | Marty et al. | 137/100 |
| 5,727,587 | * 3/1998 | Yang | 137/100 |
| 5,730,171 | * 3/1998 | Niakan | 137/98 |
| 5,881,757 | * 3/1999 | Kuster et al. | 137/454.2 |

* cited by examiner

*Primary Examiner*—George L. Walton
(74) *Attorney, Agent, or Firm*—Bacon & Thomas, PLLC

(57) ABSTRACT

An improved pressure balance device for use in a faucet is made up of a pair of symmetric semi-cylindrical units and a tubular water inlet cap. Each semi-cylindrical unit has a semi-circular cross section and on each edge of the vertical face thereof is disposed a locking protrusion and a retaining recess at the middle position thereof respectively. Under the locking protrusion and the retaining recess is disposed a radially extended lug respectively. At the central position of the arc peripheral surface of each semi-cylindrical unit is placed a wedge-shaped locking latch. The tubular water inlet cap is provided with two symmetric inverted U-shaped engagement recesses at the bottom rim thereof and right between the two engagement recesses, in either direction, is disposed a retaining hole whereby the water inlet cap can be snapped into engagement with the two assembled semi-cylindrical units and be locked integrally together with ease and speed.

3 Claims, 3 Drawing Sheets

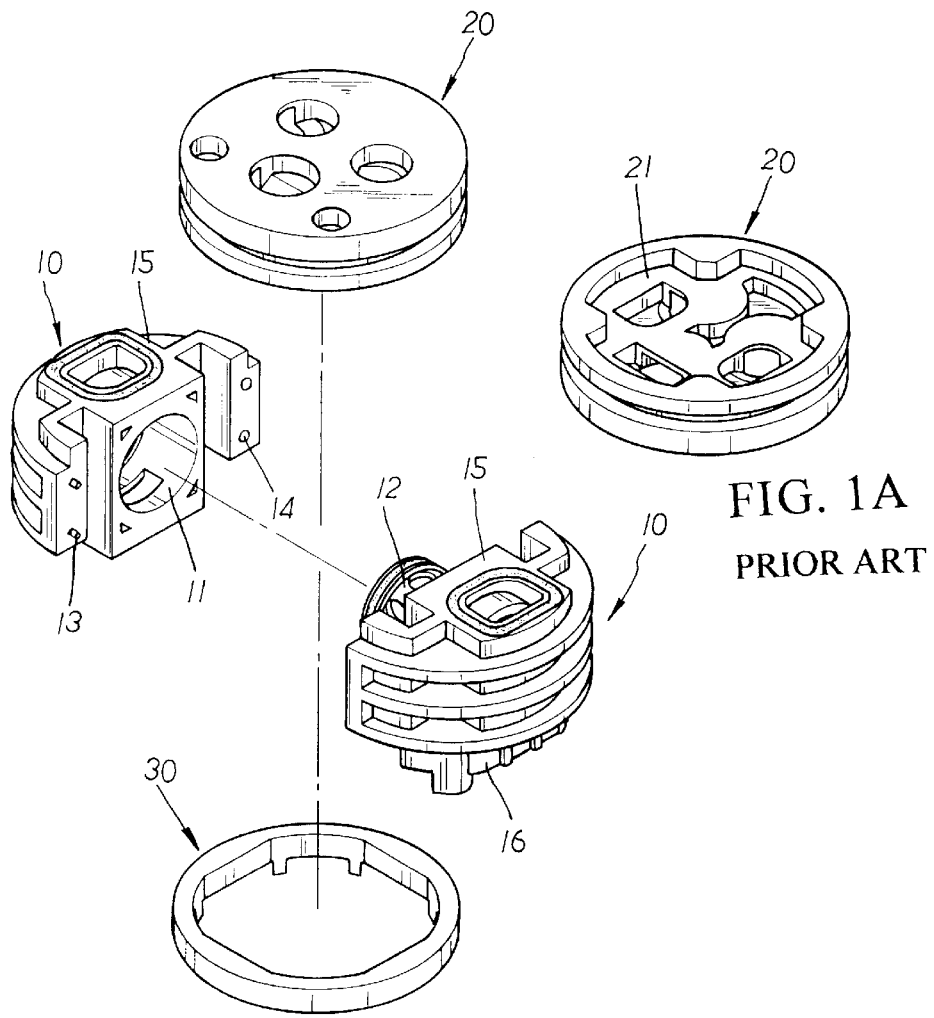
FIG. 1A
PRIOR ART
FIG. 1   PRIOR ART
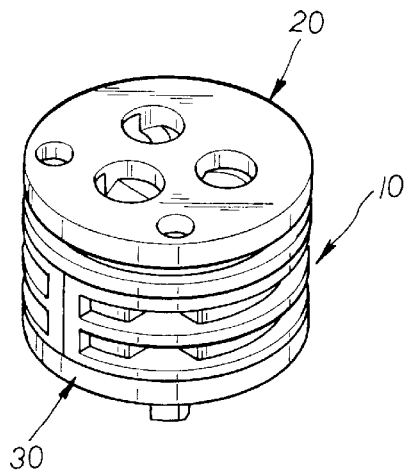
FIG. 2
PRIOR ART

PRESSURE BALANCE DEVICE FOR USE IN A FAUCET

BACKGROUND OF THE INVENTION

The present invention relates to an improved pressure balance device which is made up of a pair of symmetric half cylindrical units and a water inlet cap. The two semi-cylindrical units are put in abutment against each other and the water inlet cap can be pushed from the top of the semi-cylindrical units all the way down so as to make the assembly easier and faster as a result of reduction of components and steps in assembly.

Referring to FIG. 1, a typical conventional pressure balance device is comprised of a pair of semi-cylindrical cases 10, a water inlet cap 20 and a restraint ring 30. Each case 10 has a vertically cut flat face with a receiving chamber 11 defined thereon so as to permit a balance shaft 12 to be housed therein On the top surface of each case 10 is disposed a limiting protrusion 15 and at the bottom is disposed a retaining projection 16. On the sides of the vertically cut plane of each semi-cylindrical cases 10 are also disposed a pair of retaining rods 13 and a pair of retaining holes 14 respectively. As shown in FIG. 1A. the water inlet cap 20 of a proper thickness is circular in structure with a cross-shaped groove 21 disposed under the bottom thereof.

In assembly, as shown in FIG. 2, the two semi-cylindrical cases 10 are placed with their vertical flat faces in abutment against each other, permitting the retaining rods 13 of each semi-cylindrical case 10 to be engaged with the retaining holes 14 of the other semi-cylindrical case 10 respectively. The limiting protrusions 15 on the two semi-cylindrical cases 10 are in abutment with each other to form a cross-shaped block in fitting conformance to the cross-shaped groove 21 of the water inlet cap 20 so that the cap 20 and be engaged firmly with the two semi-cylindrical cases 10 in assembly. At last the restraint ring 30 is put into engagement with the retaining projection 16 of the assembled semi-cylindrical cases 10 to complete the assembly.

Such a prior art pressure balance structure has the following disadvantages:

1. Its assembly components are relatively numerous, and it requires many molds to produce, resulting in the costs of production relatively high
2. It takes more steps to assemble the semi-cylindrical cases 10 and the water inlet cap 20 and the restraint ring 30 together, making the assembly tedious and time consuming.

SUMMARY OF THE INVENTION

Therefore, the primary object of the present invention is to provide an improved pressure balance device which is equipped with less components so that the tooling cost in production can be effectively lowered, resulting in the cutting of production cost thereof.

The other object of the present invention is to provide an improved pressure balance device for use in a faucet wherein the water inlet cap retainer is simply forced into engagement with and encloses the assembled two half cylindrical units from top to bottom. It is assembled with such ease and speed that the time consumption and labor requirement are effectively lowered in production.

BRIEF DESCRIPTION OF THE DRAWINGS

FIG. 1 is a perspective diagram showing the exploded components of a prior art pressure balance device;

FIG. 1A is a diagram showing the reverse side of the water inlet cap of the prior art shown in FIG. 1;

FIG. 2 is a perspective diagram showing the assembly of the prior art pressure balance device;

DETAILED DESCRIPTION OF THE PREFERRED EMBODIMENT

Figure 3:
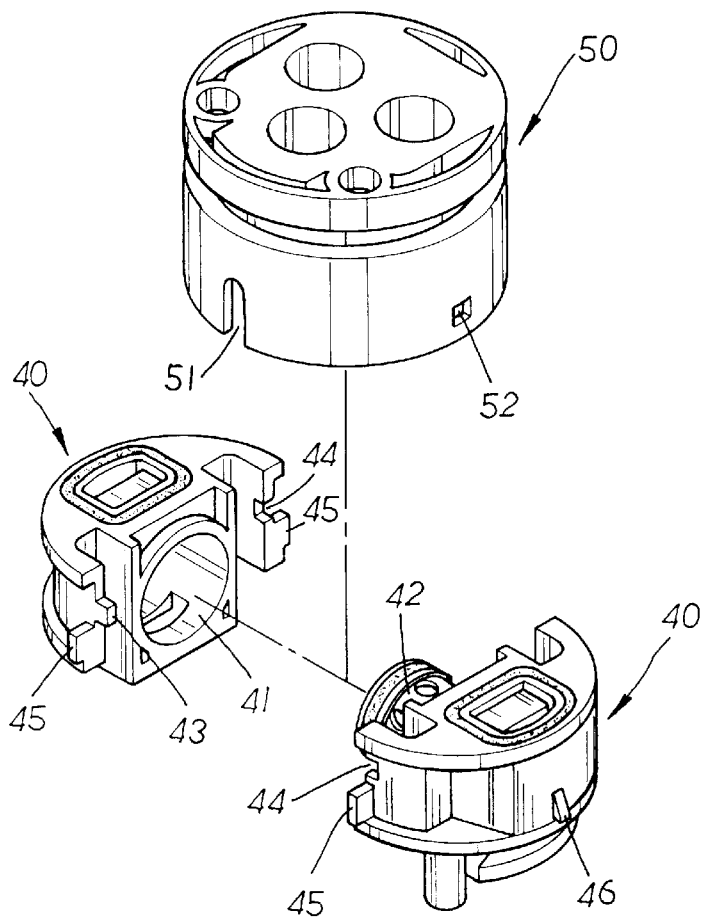
FIG. 3 is a perspective diagram showing the exploded components of the present invention.

Referring to FIG. 3, the improved pressure balance device of the present invention is comprised of a pair of semi-cylindrical units 40 and a water inlet cap 50. Each semi-cylindrical unit has a half cylinder shape. On its vertically cut plane is disposed a receiving chamber 41 in which a balance valve rod 42 can be housed. On the sides of the vertical plane is disposed a locking projection 43 and a retaining recess 44 respectively. Under the locking projection 43 and the retaining recess 44 is disposed a radially extended lug 45 respectively. At the middle of the peripheral arc surface of each semi-cylindrical unit is disposed a wedge shaped locking latch 46.

The water inlet cap 50 is a tubular form with a pair of symmetric inverted-U shaped engagement recesses 51 disposed on the bottom rim thereof. These engagement recesses 51 are positioned in conformance with the lugs 45 on the semi-cylindrical units 40. Right between the two engagement recesses 51, in either direction, is disposed a retaining hole 52 respectively.

Figure 4:
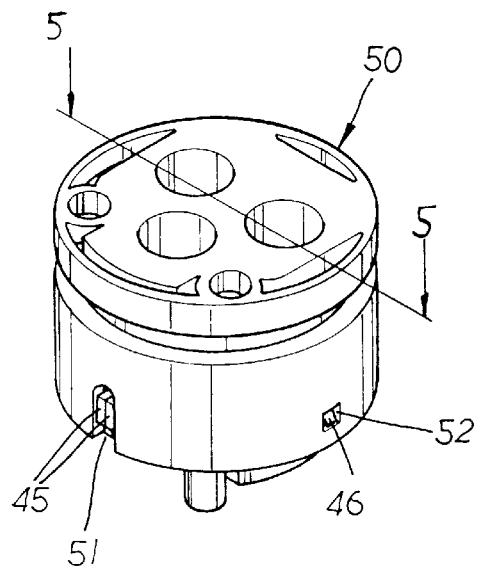
FIG. 4 is a perspective diagram showing the assembly of the pressure balance device of the present invention.
Figure 5:
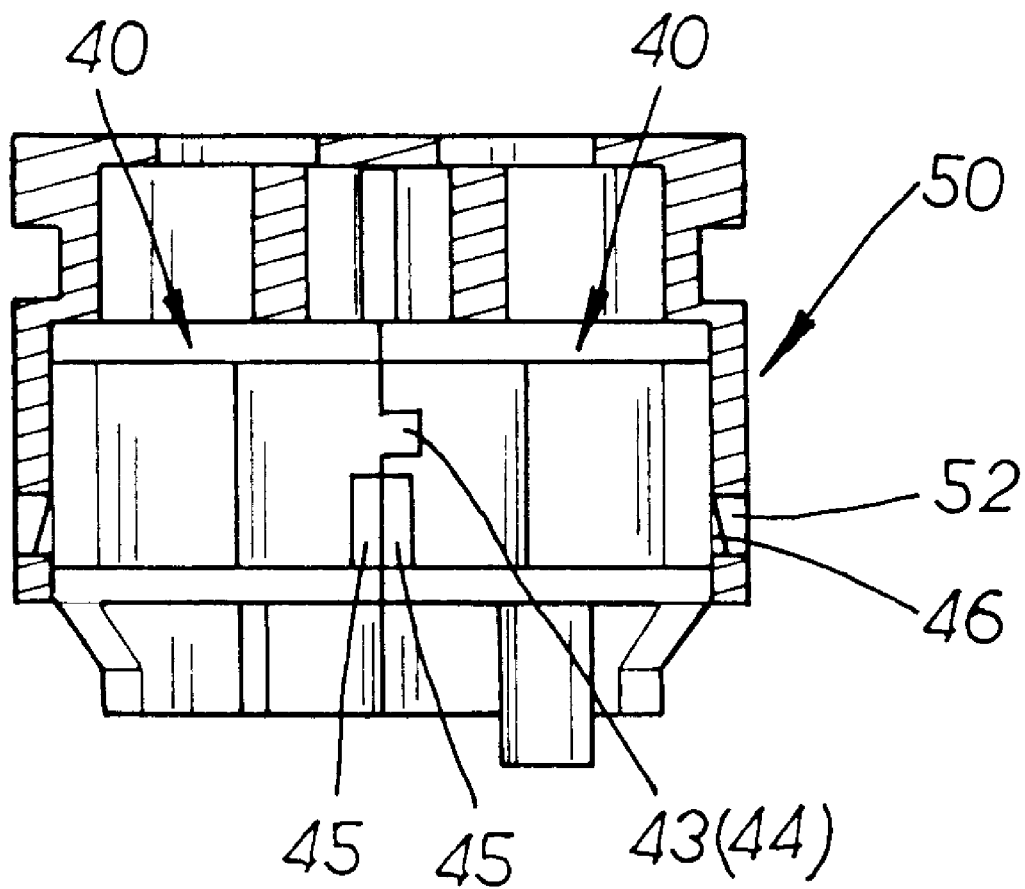
FIG. 5 is a sectional diagram taken along the line 5—5 in FIG. 4.

Referring to FIGS. 4, 5, in assembly, the two semi-cylindrical units 40 are put together with their vertical planes thereof stuck to each other by making the locking projections 43 and the corresponding retaining recesses 44 engaged with each other. The radially extended lugs 45 are closely joined side by side so as to permit the water inlet cap 50 to be pushed downwardly from the top of the united two semi-cylindrical units 40. At the same time, the lugs 45 of the united semi-cylindrical units 40 placed in abutment with each other are forced into retaining engagement with the inverted U-shaped engagement recesses 51 of the water inlet cap 50 and the wedge shaped locking latches 46 of the semi-cylindrical units 40 are snapped into engagement with the retaining holes 52 disposed on the wall of the water inlet cap 50.

It can be apparently seen that the pressure balance device of the present invention has the following advantages in practical use:

1. It has less components, making molding cost and production cost effectively cut down
2. The assembly of the pressure balance device of the present invention becomes simpler and faster than a conventional one, resulting in the cutting of labor cost in assembly line.

I claim:

1. A pressure balance device for use in a faucet, comprising a pair of semi-cylindrical units and a water inlet cap retainer; each of said semi-cylindrical units having a semi-circular cross section and having vertical cut plane on which is disposed a receiving chamber for housing a balance valve rod wherein the characteristics lie in that:

on said vertical cut plane of each of said semi-cylindrical units and on sides of said vertical plane is disposed a locking projection and a retaining recess respectively, under said locking projection and said retaining recess is disposed a radially extended lug respectively, at the middle of a peripheral arc surface of each semi-cylindrical unit is disposed a locking latch;

said water inlet cap is a tubular form with a pair of symmetric engagement recesses disposed on a bottom rim thereof, these engagement recesses are positioned in conformance with said lugs on said semi-cylindrical units between said two engagement recesses, in either direction, is disposed a retaining hole respectively;

whereby in assembly, said two semi-cylindrical units are put together with said vertical planes thereof stuck to each other by making said locking projections and said retaining recesses engaged with each other, said radially extended lugs are closely joined side by side so as to permit said water inlet cap to be pushed downwardly from the top of the united two semi-cylindrical units, at the same time, said lugs of the united semi-cylindrical units placed in abutment with each other are forced into retaining engagement with said engagement recesses of said water inlet cap and said locking latches of said semi-cylindrical units are snapped into engagement with the retaining holes disposed on the wall of said water inlet cap.

2. The pressure balance device for use in a faucet as claimed in claim 1 wherein said locking latch on the arc peripheral surface of each semi-cylindrical unit is wedge-shaped.

3. The pressure balance device for use in a faucet as claimed in claim 1 wherein said retaining recesses on the peripheral rim of said water inlet cap retainer is made in an inverted U shape.

* * * * *